United States Patent Office 2,828,239
Patented Mar. 25, 1958

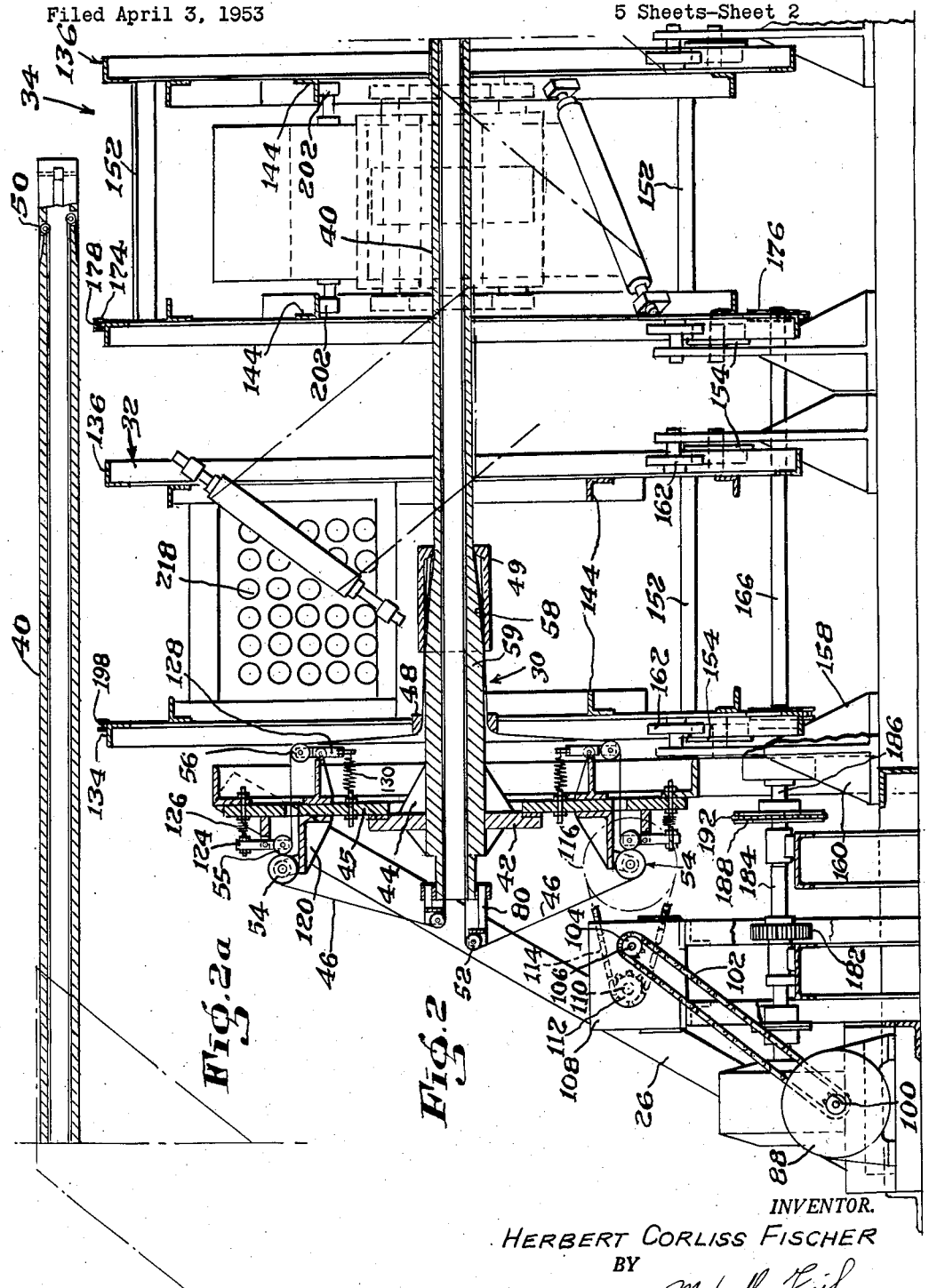

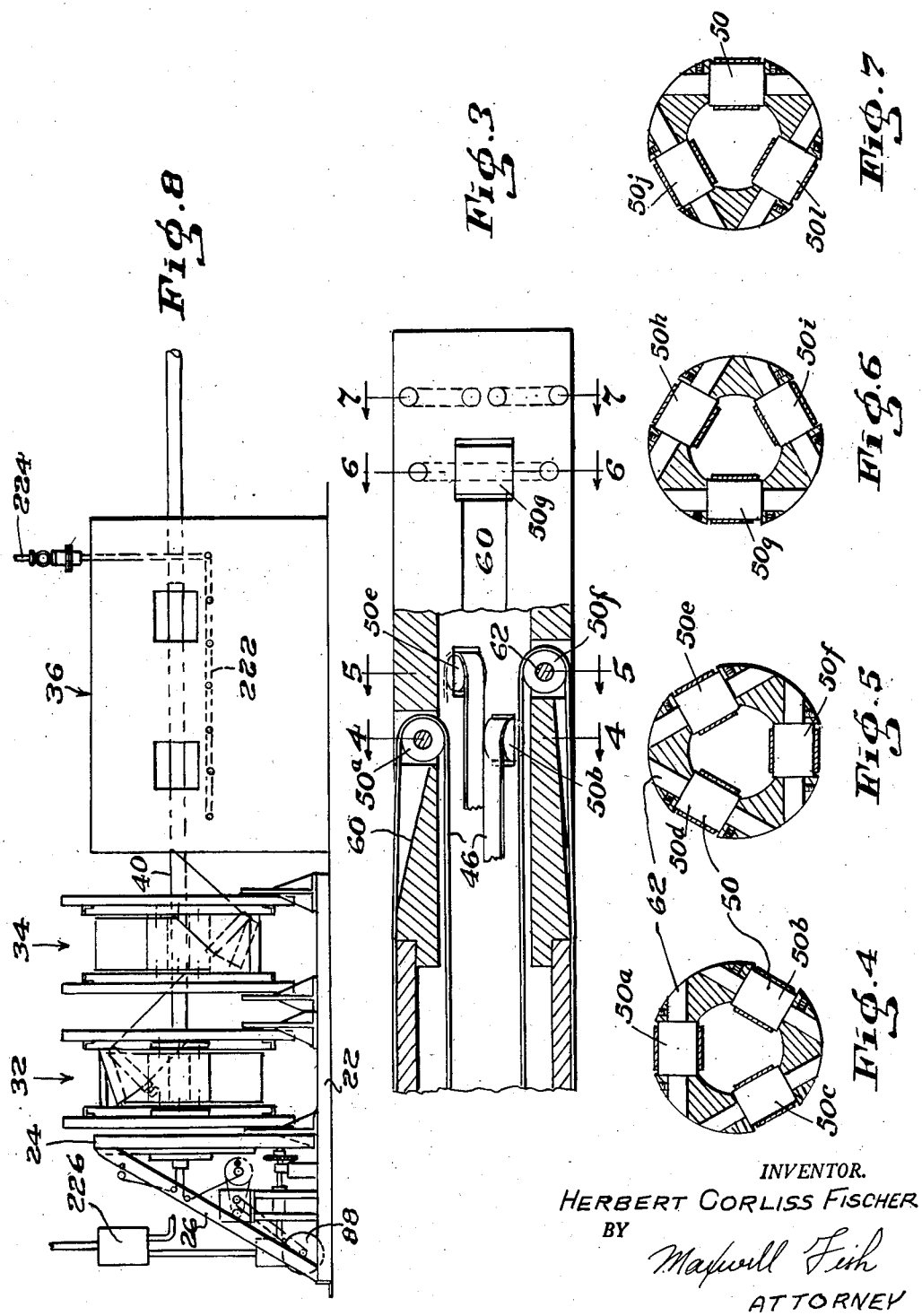

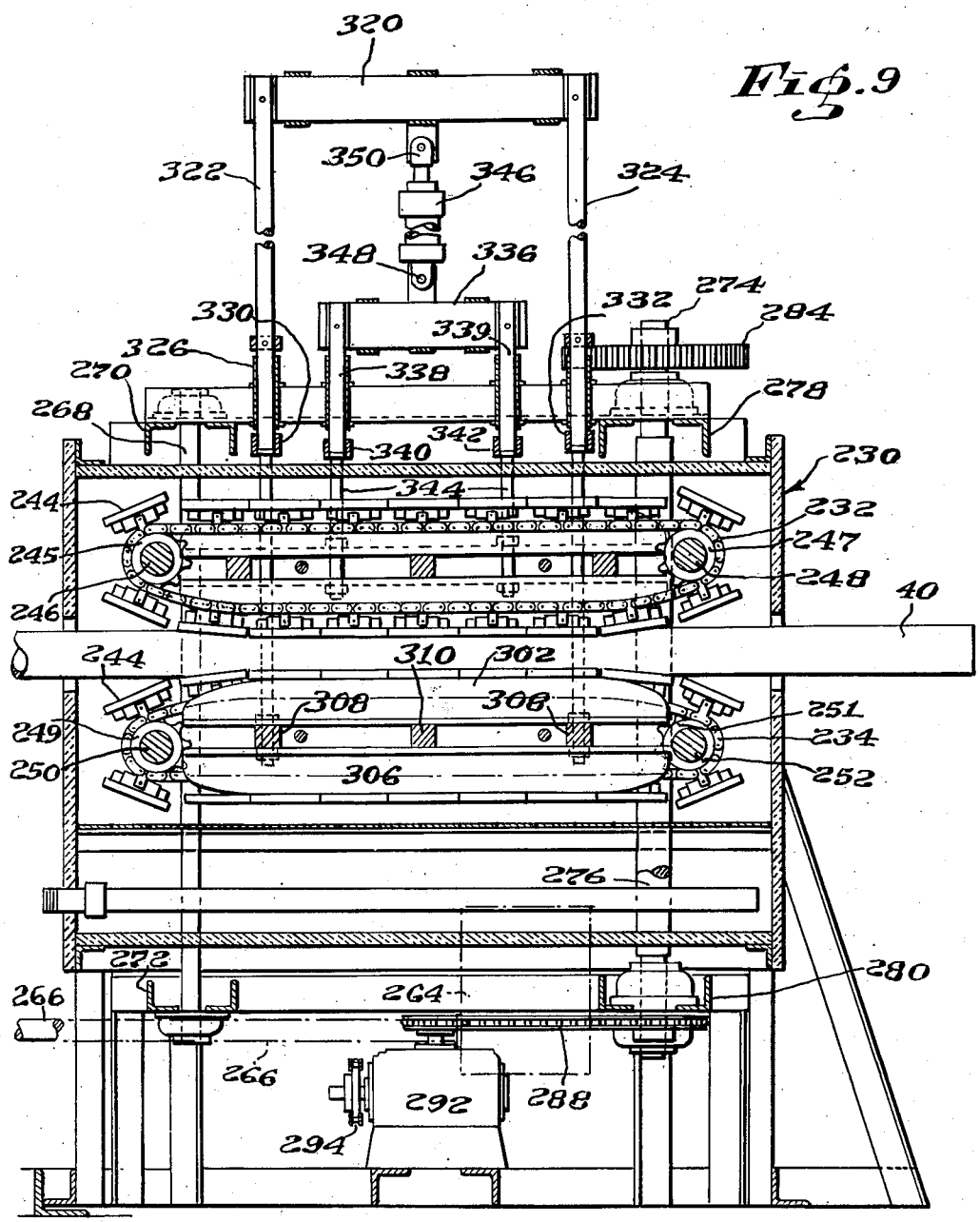

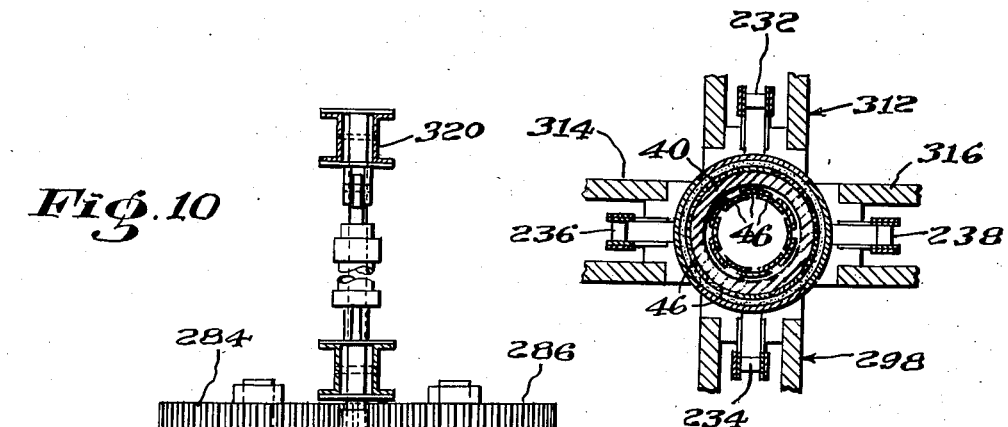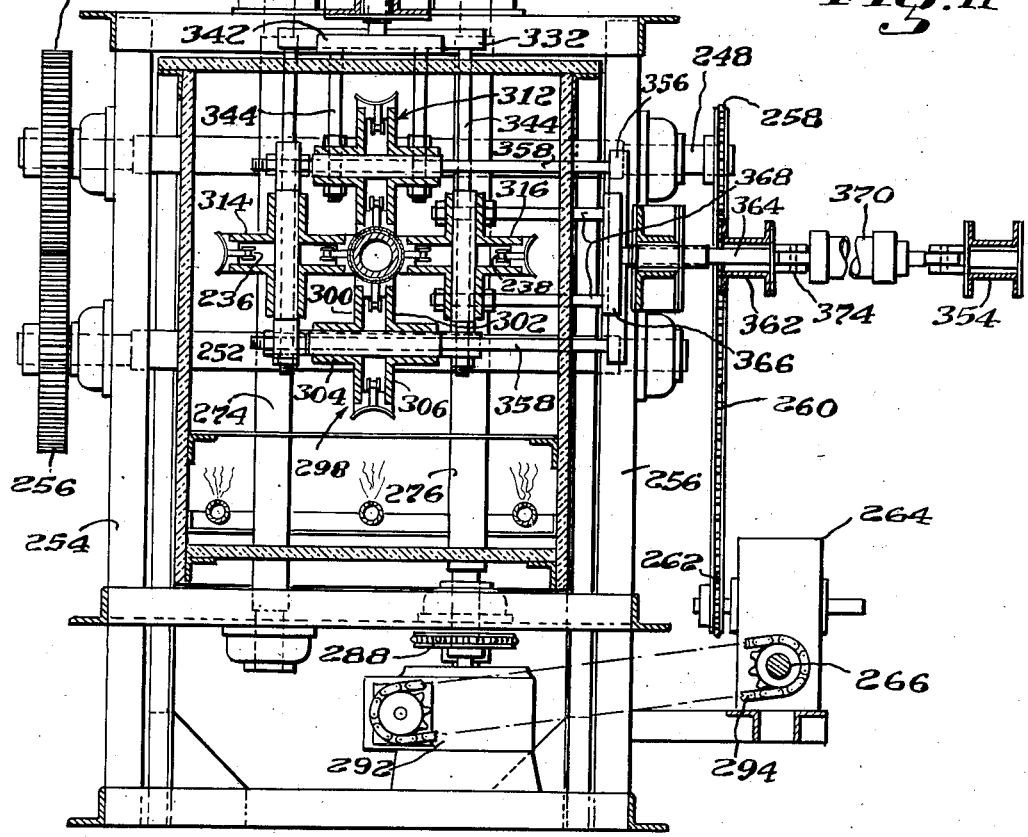

2,828,239

METHOD OF CONTINUOUSLY FORMING TUBING OF PLASTIC MATERIAL

Herbert Corliss Fischer, Wellesley Hills, Mass., assignor to National Fibre Glass Co., Inc., West Hanover, Mass., a corporation of Massachusetts Application April 3, 1953, Serial No. 346,689

5 Claims. (Cl. 154—83)

The present invention relates to improvements in the manufacture of tubing from organic plastic material, and more particularly to an improved method and apparatus for the manufacture of glass fiber tubing from bands of resin impregnated glass fiber.

While in the preferred form of the invention hereinafter described fiber glass tubing is produced from fiber glass strips impregnated with phenol-formaldehyde resin, it will be understood that the invention in its broader aspects contemplates the manufacture of tubing from other materials which may be impregnated with other available resins and lacquers.

It is a principal object of the invention to provide a novel apparatus and method for producing tubing from a material which is preferably fiber glass impregnated with a suitable resin or lacquer such as phenol-formaldehyde in a continuous process.

It is more specifically an object of the invention to provide an apparatus and method of producing glass fiber tubing which will be fully automatic and which will operate continuously to produce a high quality of tubing which may be of any desired length.

In accordance with the present invention one or more phenol-formaldehyde impregnated glass fiber strips which have been partially cured to the so-called B-stage are heated and applied as wrappers about a mandrel having a tubular wrap support surface which travels continuously away from the wrapping point so that the tubing is formed in a continuous process.

An important feature of the invention consists in the construction and arrangement of the mandrel which consists of a relatively fixed supporting tubular core and a plurality of endless carriers which are assembled and grouped in parallel relation along the length of the mandrel to form a substantially cylindrical continuously moving supporting surface. The traveling support is of sufficient length to allow the tubing to obtain an initial set and to become self-supporting before it has moved beyond the outer end of the mandrel support. The endless carriers are further supported at the tip end of the mandrel to turn inwardly and then to follow a return path through the tubular core.

In the preferred form of the invention shown the several carriers, in the form of endless metal strips, are driven at the same linear rate to provide an unyielding solidly formed cylindrical wrapping surface which travels continuously toward the tip end of the mandrel. The resin impregnated fiber glass strips are wound into rolls which are mounted on large cylindrical frames or wrappers which are rotatably mounted co-axially with the mandrel causing the strip or strips to be wound spirally on the external cylindrical surface of the mandrel.

Another feature of the invention consists in the provision of additional devices, supported externally of the mandrel, and newly formed tubing carried thereon for applying and for maintaining a regulated pressure against the tubing while moving along the length of the mandrel during the initial setting stage. Pressure is applied by means of conveyor devices having flights which successively engage and are carried along with the tubing. In the preferred form of the invention shown the conveyor devices are driven at the same linear rate with the endless carriers on which the tubing is formed, and thus perform the important additional function of assisting in the feed of the newly formed tubing along the length of the mandrel.

The several features of applicant's machine and method, hereinafter described and claimed together with the advantages to be obtained thereby, will be readily understood by one skilled in the art from the following description taken in connection with the accompanying drawings, in which:

Fig. 2 is a view partly in section looking from the right side of the machine shown in Fig. 1, the mandrel and fiber glass strip supporting wrappers having been sectioned for clarity of illustration;

Fig. 2A is a view looking from the right and in section of the outer end portion of the mandrel of which the inner end portion is shown in Fig. 2;

Fig. 3 is an enlarged detailed view in section of the tip of the mandrel to illustrate particularly the manner in which the endless metal strips forming the cylindrical wrapping surface of the mandrel are withdrawn and fed rearwardly through the mandrel;

Figs. 4, 5, 6 and 7 are sections taken respectively on and correspondingly numbered section lines of Fig. 3;

Fig. 8 is a small scale view of the machine looking from the right including a drying oven adapted for the further curing and setting of the tube during its travel along the mandrel;

Fig. 9 is a vertical section looking from the right side of the machine taken through the heating unit which surrounds the mandrel, and showing a modified form of the invention which includes conveyor devices for applying external pressure to the newly formed tubing during a major portion of its travel along the length of the mandrel;

Fig. 10 is a view partly in section looking from the left end of Fig. 9, and

Fig. 11 is an enlarged detail sectional view taken through the mandrel and clamp conveyors.

Figure 1:
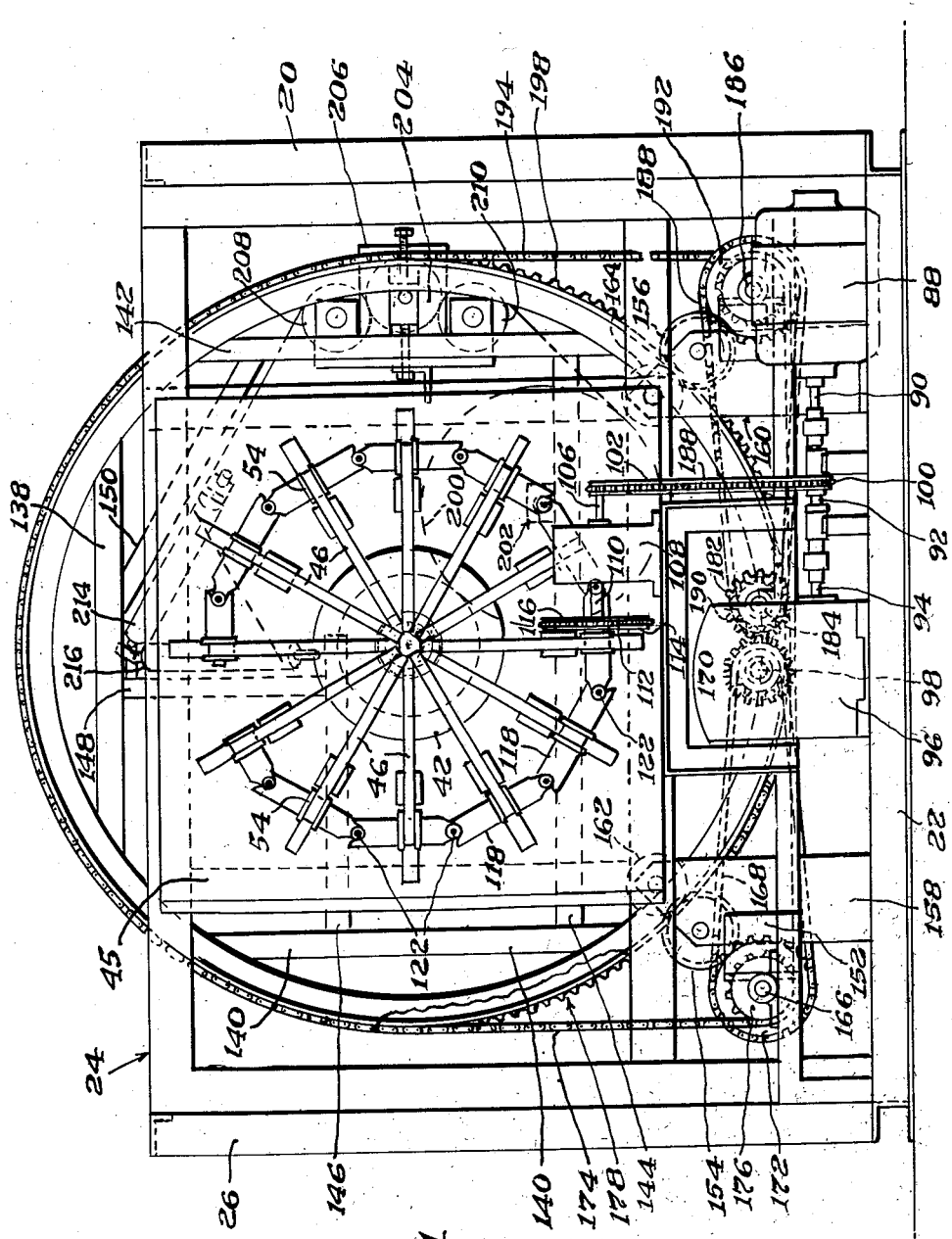
Fig. 1 is an end view of a machine for forming fiber glass tubing embodying in a preferred form several features of the invention.

The apparatus provided in accordance with the invention for the manufacture of glass tubing from phenol-formaldehyde impregnated glass fiber strips comprises a frame 20 built up of structural steel parts including a rectangular base frame 22, a rectangular upright frame 24 and a pair of diagonal upwardly extending bracing supports 26.

The principal cooperating elements of the apparatus as shown in Figs. 2 and 8 comprise a mandrel designated generally at 30, and formed with a support surface which travels continuously in the direction of feed, two wrappers 32 and 34 mounted coaxially with the mandrel, a heating oven 36 within which the portion of the mandrel extending beyond the wrappers is housed to effect an initial bonding and setting of the newly wound glass tubing, and a baking oven, not specifically illustrated to effect a final curing and hardening of the glass tubing.

The two wrappers 32 and 34 provide support for rolls of impregnated glass fiber in strip form and are constructed and arranged to deliver the strips to the mandrel at a lead angle which produces an overlap of one-half the width of each strip. The two wrappers are positively driven in opposite directions to produce spiral windings of the fiber glass strips in opposite directions on the core.

The mandrel 30, provided in accordance with the invention, comprises a tubular core member 40 which is provided at its left hand or inner end with a transverse supporting flange 42 of cylindrical shape which is formed integrally with the core, and is further rigidly connected thereto by reinforcing corner pieces 44. The flange 42 is in turn secured to a rectangular support plate 45 which is securely bolted to the upright rectangular frame 24. In the illustrated embodiment of the invention it is assumed that the total length of the core member 40 is in the neighborhood of about 12 feet, and the effective length of tubing which will be wound and supported upon the mandrel at one time is approximately 10 feet.

The outside face or surface of the mandrel, onto which the impregnated strips are wound, is formed by a group of 12 endless steel tapes 46 which are grouped about the core member 40 and extend longitudinally thereof to form a rigid cylindrically shaped tube supporting surface which moves continuously along the length of the core 40, taking shape at the left hand or inner end of the mandrel and collapsing inwardly at the right hand or outer end of the mandrel to free the partially hardened fiber glass tube therefrom. Each tape 46 is supported toward the left or inner end of the mandrel to pass under a collar 48 and under a collar 49, thence along the length of the core member 40, around a roller 50, and back through the passageway provided along the axis of the tubular core, around an idler roller 52, thence in a generally radial direction outwardly to a driving roller 54, and associated pinch roller 55 over a take-up tensioning roller 56 to the initially referred to guide collar 48.

In the apparatus shown, the external diameter of the mandrel provided by the tapes 46 is assumed to be 4 inches. Each steel tape provided for the particular mandrel illustrated is 1 inch in width, and the individual tapes are separated from one another by $\frac{1}{64}$ of an inch.

While in the illustrated form of the invention a group of 12 endless steel tapes have been employed to provide a tubular support for the manufacture of glass tubing having a four inch internal diameter, it will be understood that the invention in its broader aspects contemplates the manufacture of tubes which may be of substantially larger or smaller diameters. Other forms of conveyors may be employed in place of the tapes specifically illustrated including chain conveyors with flights, or wires which would be arranged and supported in substantially the same manner as the steel tapes shown.

In order to insure that the several tapes 46 will be maintained accurately in position with relation to one another to provide a rigidly formed cylindrical tube supporting surface during the travel along the length of the core member, special means are provided for supporting and for guiding each of the several tapes along an exactly predetermined path along the outside of the core member 40. At the inner or the left hand end of the mandrel tapes 46 passing under the collar 49 are caused to ride in grooves 58 formed in an enlarged base end portion 59 of the core member 40 so that the tapes are individually accurately positioned at the beginning of their movement along the surface of the mandrel. At the outer or right hand end of the mandrel each tape 46 is directed inwardly at a slight angle toward the axis of the core member into a shallow inwardly sloping groove 60 which is formed in the outer end of the core member, and which terminates in a slot of sufficient size to support the small roller 50 above referred to mounted on a pivot pin 62 and having its external surface sufficiently below the peripheral surface of the bore member so that the associated tape will be bent inwardly into the slot 60 above referred to. The grooves 58 and 60 acting as guide surfaces have been found to maintain the tapes in their correct relative positions with a high degree of accuracy. The slots 60 serve also to maintain the steel tapes accurately in position as they pass around the rollers 50 at the tip end of the mandrel.

For the return movement through the bore of the core member 40, the tapes are nested in overlapping relation. In order to provide sufficient space for the turning inward and reversal of the individual tapes for their return movement the rollers 50 are ararnged in four groups of three each, as specifically shown in Figs. 4 to 7, inclusive, the three rollers of each group being equally spaced 120° apart about the periphery of the mandrel. The rollers of the first group shown in Figs. 3 and 4 indicated at 50a, 50b, and 50c are so located as to cause the tapes, passing around these rollers, to be withdrawn from engagement with the newly formed glass fiber tube and to start the return movement while the remaining tapes continue their feeding movement. A second group of 3 rollers are spaced 60° about the mandrel axis from the first group and also further toward the nose of the mandrel. The tapes passing over the second group of rollers illustrated in Figs. 3 and 5 at 50d, 50e and 50f are withdrawn from engagement with the fiber glass tubing and are then reversed to start their return movement within the mandrel bore. The third group of three rollers 50, as indicated in Figs. 3 and 7 at 50g, 50h and 50i, are spaced angularly from the group of rollers shown in Fig. 5 by an amount of 30° to the left and are located still further toward the nose of the mandrel. The fourth group of rollers as shown in Figs. 3 and 6 at 50j, 50k, 50l are spaced angularly to the left from the second group of rollers in Fig. 5 by 20° to the left, and at a still further distance toward the nose of the mandrel.

With the arrangement of the rollers 50 shown the tapes are withdrawn and started on their return movement in successive groups of three, which are so chosen as to provide for the efficient nesting of the twelve tapes within the relatively confined hollowed-out interior of the core.

As previously noted the tapes 46 emerging from the rear end of the mandrel bore are supported by and pass around the rollers 52. These rollers are mounted on brackets 80 in groups of three, the rollers of each group being spaced equal distances apart around the periphery of the mandrel. The groups of rollers 52 are spaced lengthwise of the mandrel and angularly with relation to one another to facilitate the unnesting and guiding of the tapes in diverging directions.

The twelve driving rollers 54 and the twelve tapes 46 driven thereby are advanced at the same linear rate to provide a solidly formed continuously advancing cylindrical tube supporting surface by means of driving connections from an electric motor 88 supported on the machine base. The armature shaft 90 of the motor is connected through couplings and an intermediate shaft 92 with the input element 94 of a reduction gear speed box 96. A rearwardly extending output shaft 98, from the gear box 96 is utilized to drive the two wrappers as hereinafter set forth. The drive for the 12 rollers 54 is taken from the shaft 92 on which is mounted a sprocket 100 connected by a sprocket chain 102 with a sprocket 104 on the input shaft 106 of a second reduction gear box 108. An output shaft 110, from the gear box 108, is connected by a sprocket 112 and sprocket chain 114 with a driven sprocket 116 supported to turn with the driving rollers 54. As best shown in Figs. 1 and 2, the several driving rollers 54 are formed on individual shafts 118 which are arranged in a circular relation, each being mounted on a bracket 120 (Fig. 2) on the supporting plate 45, and connected with its adjacent roller shafts 118 by universal joints 122. Approximately half of the roller shafts 118 are connected end-to-end to one side of the driving roller shaft 118 which carries sprocket 116 and the remaining roller shafts 118 are similarly connected end-to-end with the other end of the driving shaft 118. With this construction and arrangement of the individual rollers 54, it will be seen that they are simultaneously driven at the same linear rate through the driving connections from the motor terminating in the sprocket 116.

In order to maintain a driving contact without slippage between each of the driving rollers 54 and associated endless tapes 46 one or more pinch rolls, such as that indicated at 55 are carried on pivoted arms 124 and are maintained yieldably in contact with the roller 54 by means of a tension spring 126. Slack is removed from each tape 46 by means of the associated take-up roller 56 which is supported on take-up roller arm 128 and is held against the tape 46 under tension by means of a tension spring 130.

Each wrapper comprises a pair of ring frames 134, 136 which are formed from angle irons bent into a circular shape and are supported in parallel relation to give the wrapper a generally cylindrical outline. Each ring frame has mounted therein a number of bracing and supporting members such as those indicated at 138, 140, 142, 144, 146, 148 and 150 (see Fig. 1) and suitable cross pieces 152 (see Fig. 2) connecting the two ring frames 134, 136 rigidly together. The two wrappers are externally supported to turn about an axis which coincides with the center line of the relatively stationary mandrel 40. Each ring frame 134, 136 is supported on two outside rollers 154, 156 mounted on supporting brackets 158, 160 on the machine base and arranged to engage the laterally extended flange portion of the respective ring frame. There is also mounted on the respective brackets 158, 160 cooperating rollers 162, 164 which engage against the inner surface of the flange on the ring frame.

The two wrappers 32 and 34 are driven from the machine motor 88 through the reduction gear box 96, above referred to, at a rate which has a definite relation to the linear feed rate to the several steel tapes 46 comprising the external tube supporting surface of the mandrel. As best shown in Figs. 1 and 2 the connection for driving the wrapper 34 comprises a counter-shaft 166 which extends along the rear side of the machine and is connected to be driven from the drive shaft 98 by means of a sprocket chain 168, a sprocket 170 on the shaft 98 and a sprocket 172 on the counter-shaft 166. The counter-shaft 166 is connected to drive the wrapper 34 by means of a sprocket chain 174 which passes around a sprocket 176 on the counter-shaft 166 and around a large sprocket 178 formed on the outwardly extending edge of ring frame 134 of the wrapper 34.

The left hand wrapper 32, as viewed in Fig. 2, is driven from the drive shaft 98 in the opposite direction from the wrapper 34 through connections which include a spur gear 180 on the drive shaft 98, a spur gear 182 meshing therewith on a parallel jack shaft 184, and a counter-shaft 186 located at the front side of the machine. As best shown in Fig. 1, a counter-shaft 186 is driven from jack shaft 184 by means of a sprocket chain 188 which rides around a sprocket 190 on the jack shaft 184 and around a sprocket 192 on a counter-shaft 186. The wrapper 32 is driven from counter-shaft 186 by means of a sprocket chain 194 which passes around a sprocket 196 on counter-shaft 186 and around a large sprocket 198 formed on the outwardly extending flange portion of ring frame 134 of the wrapper 32.

As best shown in Figs. 1 and 2 the wrapper 32 provides support for a supply roll of resin impregnated fiber glass material indicated in dotted lines at 200 in Fig. 1. The roll is being supported to turn freely on bearing blocks 202 carried on the supporting members 144 mounted on each of the ring frames 134, 136. Inasmuch as all of the parts of the two wrappers 32 and 34 are identical except that they are of opposite hand, for clarity of description identical parts forming the same functions in the two wrappers are given the same reference characters. It will be understood that the resin impregnated fiber glass material contained in the supply roll 200 has been processed preferably to the so-called B-stage by baking to remove the more volatile solvents from the resin. The material is drawn in the form of a web from the supply roll 200 through a friction roll braking device which comprises a braking roll 204 slidably supported within bearing blocks 206 on the support members 142 on each of the ring frames 134, 136, and two associated nip rollers 208, 210 fixedly mounted on bearing blocks on the support members 142 at each side of the braking roller 204. A frictional resistance to turning may be imposed on the braking roller 204 by a conventional strap-and-drum type frictional brake, not specifically shown. The web of resin impregnated fiber glass material, after passing through the friction braking unit above described, is passed around suitable guide rollers which may include rollers 214 and 216 so that the web is turned and guided from the wrapper at a right angle for wrapping onto the traveling mandrel surface. In the illustrated machine the relative rate of drive, the angle of delivery of the web to the mandrel, the driving rate of each wrapper and the rate of feed of the mandrel surface forming tapes 46, are adjusted to produce an overlap of one-half the width of the material during the winding operation. During the passage of the resin impregnated fiber glass web from the supply roll 200 to the point of discharge from the wrapper, the web is subjected to heat, as for example, by means of two or more electric batteries of lamps as that indicated at 218 in Fig. 2 which tend to soften and to render the material more pliable and to condition the resin for the following winding and fusing operations about to take place.

As best shown in the general view of the machine (Fig. 8) the mandrel 40 passes through a drying oven 36 having gas burners 222 and a gas supply connection 224 by means of which the newly formed tubing is subjected to sufficient heat to produce a rapid setting and hardening of the resin. A temperature of about 350° F. to 750° F., depending on the length of dwell in the heat zone, has been found most effective for this purpose. An electrical outlet which may be of ordinary description is indicated at 226 (Fig. 8) for supplying power to the motor 88 and to the battery of heating lamps 218 in the wrappers 32 and 34.

In the modified form of the invention shown in Figs. 9–11 means are provided for applying external pressure to the newly formed tubing during its travel along the length of the mandrel 40 and while it is being subjected to heat to effect the initial setting of the newly formed tubing. In this form of the device the initial setting is effected by a combination of heat and pressure which is readily adjustable to attain any desired characteristics of strength and toughness in the finished product. The application of external pressure, in accordance with the disclosure of Figs. 9–11, has been found to produce a much tougher, harder product than that produced without the use of the external pressure. As shown in Figs. 9 and 10 the mandrel passes through a dryer 230 which has mounted therein a series of four chain type conveyors including a top conveyor 232, a bottom conveyor 234, and two side conveyors indicated respectively at 236 and 238 in Figs. 10 and 11.

The several conveyor units are similar in construction, each comprising a chain supported at each end of its travel on a sprocket and provided along its length with flights 244 having curved tube engaging surfaces, each of which is arcuate in shape to extend approximately one-quarter of the peripheral distance about the mandrel. The several supporting sprockets are mounted on supporting shafts which extend across the width and height of the dryer and are supported to turn in bearings to be carried externally thereof. The flights 244, during their travel with their conveyor chains are guided and are moved under pressure against the tubing and supporting mandrel during the travel with the moving mandrel surface in the direction of feed by means of guideways or tracks which engage with and control the positions of the flights during their travel in their lengthwise direction, and which are adjustable toward and away from the mandrel to cause the flights to be moved against the mandrel and tubing formed thereon with any desired degree of pressure.

Referring more specifically to the drawing, the chain carrier 232 passes around a sprocket 245 carried on an idler shaft 246 and around a sprocket 247 carried on a power driven shaft 248. The chain carrier 234 is similarly supported at its left hand end on a sprocket 249 carried on an idler shaft 250, and at its right hand on a sprocket 251 carried on a drive shaft 252. Each of these shafts are supported externally of the dryer in bearings formed in frame uprights 254, 256. As best shown in Fig. 10 the drive shafts 248, 252 are connected to rotate in opposite directions by meshing the spur gears 254, 256 at the rear side of the machine. At its forward end drive shaft 248 carries a sprocket 258 which is connected by a chain 260 with a sprocket on an output shaft 262 of a reduction gear unit 264. This unit as indicated in dot and dash lines in Fig. 9 is provided with an input shaft 266 which is coupled to the shaft 186 by means of which the first wrapper unit 32 is driven.

The conveyors 236, 238 (see Fig. 10) are supported at the left hand end of the apparatus, on sprockets carried by two parallel vertically disposed idler shafts 268, (see Fig. 9) carried in bearings formed in frame members 270, 272 externally of the dryer 230. At the right hand end of the apparatus, and as shown in Fig. 10 the horizontally disposed conveyors 236, 238 are carried on sprockets mounted on two parallel vertical drive shafts 274, 276 mounted at their upper ends in bearings on frame members 278 and at their lower ends in bearings carried on frame members 280, externally of the dryer 230. The drive shafts 274, 276 are connected to turn in opposite directions by means of meshing gears 284, 286 carried on the upper ends of the shafts. At its lower end shaft 276 is connected by means of sprockets and a sprocket chain 288 with the output shaft of a gear reduction unit 292, which is in turn connected by means of sprockets and a sprocket chain 294 with the input shaft 266 of the gear reduction unit 264.

Substantially similar cam tracks or guideways are provided for guiding the flights 244 associated with each of the chain conveyors against the mandrel and tubing carried thereon. As shown in Figs. 9 and 10 the chain conveyor 234 is provided with a cam track 298 which takes the form of four angle irons including two complementary upper angle irons 300, 302, and two complementary lower angle irons 304 and 306 which are supported in fixed spaced relation to the upper angle irons by means of two cross bars 308 and an intermediate spacer member 310. The two upper irons 300 and 302 and also the two lower irons 304 and 306 are separated from one another to receive the chain conveyor 234. The top and bottom edges of the several angle irons form cam surfaces which engage with and support the flights 244 during movement in each direction lengthwise of the mandrel 40. The upper chain conveyor 232, and also the two side chain conveyors 236, 238 are each provided with cam tracks which are identical in construction with the cam track 298 above described for supporting and guiding the associated flights 244 and are indicated at 312, 314 and 316, respectively.

The cam track 298 associated with the lower chain conveyor 234, and the track 312 associated with the upper chain conveyor 232, are moved simultaneously and in opposite directions to engage the flights 244, guided thereby under a substantial pressure against the respective upper and lower sides of the mandrel and newly wound tube, supported thereon by means of a hydraulically operated pressure device which acts in opposite directions against the two cam tracks 298 and 312 and thereby causes a balanced pressure to be exerted against the top and bottom sides of the mandrel. The pressure exerting device referred to comprises a beam 320 which is supported above the machine in parallel relation to the mandrel and has connected to the two ends thereof downwardly extending links 322, 324 which are slidably supported in sleeve guides 326 in the frame member 270, and are connected at their lower ends respectively to cross yokes 330, 332. Links 334 suspended from each end of each cross yoke 330, 332 are connected at their lower ends with the ends of the cross bars 308 to support and draw the lower cam track 298 and flights 244 engaged thereby upwardly against the mandrel. A second beam 336 supported above the machine but below the beam 330 and in parallel relation thereto is provided at its ends with downwardly extending links 338, 339 having mounted at their lower ends cross yokes 340, 342. Links 342 extending downwardly from the two ends of each yoke 340, 342 are connected at their lower ends to the cam track 312 to support and to force the cam track 312 and flight 244 supported thereby downwardly against the mandrel. The two beams 320 and 336 are moved away from one another by means of a hydraulic cylinder 346 which is pivotally connected at 348 to the lower beam 336, and is provided with a piston rod 350 which is similarly connected to the upper beam 320. It will be appreciated that as fluid under pressure obtained from any convenient source is supplied to the cylinder 346 to separate the beams 320 and 336 the lower cam track 298 will be drawn upwardly while at the same time the upper cam track 312 is drawn downwardly to engage the flights supported thereby respecively at the desired pressure against the lower and upper sides of the tubing on the mandrel.

The cam track 314 associated with the left or rear side chain conveyor 236, and the cam track 316 associated with the right hand or near side chain conveyor 238, are arranged to be moved simultaneously and in opposite directions to engage the flights 244, guided thereby, under a substantial pressure against opposite sides of the newly wound tubing on the mandrel by means of a hydraulically operated pressure exerting device which is substantially identical with that previously described for controlling the vertically acting cam tracks 312 and 298. The pressure exerting device, as best shown in Fig. 10, comprises a beam 354 which at it opposite ends is connected by means of links, not specifically shown, with two cross yokes, one of which is indicated at 356. The cross yokes 356 are in turn connected by means of links 358 with cross bars 360 which form a part of the cam track 314 assembly. A second beam 362 supported externally of the oven in parallel relation to the beam 354 is connected at its opposite ends by two links, one of which is indicated at 364 with two cross yokes 366. The ends of the cross yokes 366 are connected by four horizontal links 368 with the cam track 316. The two beams 354, 362 are moved away from one another by means of a hydraulic cylinder 370 pivotally connected at 372 to the beam 362. A piston rod 374 for the cylinder is pivotally connected at 376 to the beam 354. Fluid under pressure supplied from any convenient source to the cylinder 370 will cause the two beams 362, 354 to be relatively separated thus forcing the right hand cam track 316 and the flights 244 engaged thereby to the left, while at the same time the cam track 314 and flights 244 engaged thereby are forced to the right to exert a molding pressure against the newly formed tubing on the mandrel.

The method disclosed in accordance with the invention of continuously forming tubing of organic plastic material, and more particularly forming tubing from thermosetting resin impregnated fiber glass strip material, comprises the steps of continuously forming a rigidly shaped mandrel conveyor surface, advancing the conveyor surface through a substantial distance, spirally winding organic plastic strip material in over-lapping relation onto the advancing mandrel surface, applying a solidifying medium to harden the wound tubing, and thereafter when the tubing has been hardened to a point where it is self-supporting, collapsing the traveling mandrel surface inwardly. In this manner it will be appreciated that the tubing is supported in a relatively stationary position on a rigidly formed support during the initial hardening operation, and the support is thereafter withdrawn inwardly so that a continuous tube is produced, which is accurately formed and which is unencumbered by a core or other superfluous structural elements.

It is preferred to employ fiber glass strips impregnated with suitable thermosetting resin which may be a phenol-formaldehyde resin such as Bakelite. The resin impregnated material is supplied in strip form wound on rolls suitable for use in the wrappers 32, 34 of the machine having been previously conditioned for use by heating or baking to the so-called B-stage in which the volatile solvents have been removed. During the strip feeding and wrapping operations the phenol-formaldehyde resin impregnated strip is subjected to heat to make the material soft and pliable. The tubing as it is formed by the wrapping operation is carried slowly along the length of the traveling mandrel while at the same time it is baked to further cure and to set the phenol-formaldehyde resin impregnated material in its tubular form. The tubing when discharged from the traveling mandrel is preferably subjected to further drying and curing in an oven, not specifically shown, and may be cut into lengths as may be desired for subsequent use.

In the modified form of the invention shown in Figs. 9–11 the newly wound tubing is subjected to external pressure which has the effect of further hardening the resin impregnated material.

It will be understood that other organic plastic materials well known in the art may be employed in accordance with the invention, as for example polyester resins which are thermosetting, or other organic plastic materials may be employed in which a solidifying medium other than heat and pressure may be utilized to harden the tube during its travel along the conveyor surface of the mandrel.

Features of the invention relating specifically to improvements in apparatus for continuously forming a product from plastic material have been made the subject matter of a separate application Ser. No. 446,899, filed July 30, 1954, for Apparatus for Continuously Forming Products From Plastic Material now Patent No. 2,777,501.

The invention having been described what is claimed is:

1. The method of continuously forming glass fiber tubing from strips of phenol-formaldehyde resin impregnated glass fiber material which comprises the steps of continuously forming a rigidly shaped mandrel surface, advancing said surface through a predetermined distance, and thereafter collapsing said surface, spirally winding said phenol-formaldehyde resin impregnated glass fiber strip material in over-lapping relation onto said traveling mandrel surface, subjecting said impregnated strip material on the mandrel surface to heat and external pressure simultaneously around the entire periphery thereof while advancing through a substantial distance with said mandrel surface to form hardened tubing of said material, and discharging the hardened tubing over the collapsing mandrel surface.

2. The method of forming tubing of plastic material, which comprises continuously forming a rigidly shaped mandrel surface, continuously forming a tube of plastic material on said surface, advancing the newly formed tube and rigidly shaped mandrel surface therewith through a substantial distance, continuously subjecting the tube to external setting pressure simultaneously around the entire periphery thereof during the continued advance of the newly formed tube, and collapsing and withdrawing inwardly said cylindrical mandrel surface.

3. The method of forming tubing of plastic material, which comprises continuously forming a rigidly shaped mandrel surface, positively and independently of the tubing to be formed thereon advancing said surface through a substantial distance, continuously forming a tube of plastic material on said surface, advancing the newly formed tube and surface therewith through a substantial distance, subjecting said newly formed tube to external setting heat and pressure simultaneously around the entire periphery thereof during said advance, and collapsing and withdrawing inwardly said cylindrical mandrel surface.

4. The method of forming tubing of plastic material, which comprises forming a rigidly shaped mandrel surface of a plurality of endless tapes externally supported for movement in one direction on a tubular mandrel element, and having return portions of said tapes disposed within said tubular mandrel, continuously forming a tube of plastic material on the rigidly shaped mandrel surface provided by said tapes, positively and independently of the tubing to be formed thereon continuously advancing said tapes at the same linear rate to advance the newly formed tube and surface forming portions of said tapes therewith through a substantial distance, subjecting said newly formed tube to external setting heat and pressure directly radially against said tube supporting mandrel surface during said advance, and collapsing and withdrawing inwardly said cylindrical mandrel surface to discharge the solidly formed tube from the mandrel.

5. The method of forming tubing of plastic material, which comprises positioning a tube to be cured on a tubular supporting mandrel surface provided by a plurality of longitudinally extending tapes arranged in tubular relation, positively and independently of the tubing to be formed thereon, effecting a relative movement of said tapes as a unit longitudinally with relation to a tubular mandrel element on which the tapes are supported for a portion at least of their length to advance the tube to be cured over the mandrel, subjecting the tube to be cured to an external hardening medium including pressure while supported against the mandrel, and effecting a further relative longitudinal movement of said tapes as a unit and of said tubular mandrel element independently of the tube to discharge the tube from the mandrel.

References Cited in the file of this patent

UNITED STATES PATENTS

| | | |
|---|---|---|
| 2,296,781 | Farny | Sept. 22, 1942 |
| 2,331,969 | Friedrichs et al. | Oct. 19, 1943 |
| 2,398,876 | Bailey | Nov. 15, 1946 |
| 2,442,948 | Bogoslowsky | June 8, 1948 |
| 2,558,849 | Hodge | July 3, 1951 |
| 2,637,674 | Stahl | May 5, 1953 |
| 2,690,412 | Nebesar | Sept. 28, 1954 |
| 2,723,705 | Collins | Nov. 15, 1955 |